United States Patent [19]

Peterson et al.

[11] Patent Number: 5,641,374
[45] Date of Patent: Jun. 24, 1997

[54] APPARATUS AND METHOD FOR PREVENTING DEFECTS DURING THE LAMINATION OF MATERIALS

[75] Inventors: John A. Peterson, Hastings; Richard T. Stone, Minneapolis, both of Minn.

[73] Assignee: Minnesota Mining and Manufacturing Company, St. Paul, Minn.

[21] Appl. No.: 405,531

[22] Filed: Mar. 16, 1995

[51] Int. Cl.$^6$ ..................................................... B32B 31/04
[52] U.S. Cl. ........................................ 156/324.4; 156/555
[58] Field of Search ........................................ 156/555, 582, 156/583.1, 324, 308.2, 324.4; 100/166, 173, 174

[56] References Cited

U.S. PATENT DOCUMENTS

| | | | |
|---|---|---|---|
| 2,700,630 | 1/1955 | Bukey | 156/500 |
| 2,771,388 | 11/1956 | Rocky | 156/231 |
| 2,956,917 | 10/1960 | Fasano | 156/231 |
| 3,458,375 | 7/1969 | Williams | 156/152 |
| 4,069,081 | 1/1978 | Drower | 156/273.3 |
| 4,659,927 | 4/1987 | Tago et al. | |
| 4,717,441 | 1/1988 | Seki et al. | |
| 4,861,409 | 8/1989 | Hashida et al. | 156/555 |
| 4,865,675 | 9/1989 | Yamamoto et al. | |
| 4,909,890 | 3/1990 | Bonnyman | |
| 4,943,222 | 7/1990 | Nathoo | |
| 4,946,640 | 8/1990 | Nathoo | |

FOREIGN PATENT DOCUMENTS

| | | |
|---|---|---|
| 0226376A2 | 1/1986 | European Pat. Off. |
| 0496375A2 | 7/1992 | European Pat. Off. |
| 0546717A3 | 6/1993 | European Pat. Off. |
| 0587368A1 | 3/1994 | European Pat. Off. |
| 63-81027 | 9/1986 | Japan |
| 63-196447 | 8/1988 | Japan |
| 4-168009 | 6/1992 | Japan |
| 4-173142 | 6/1992 | Japan |

*Primary Examiner*—Daniel Stemmer
*Attorney, Agent, or Firm*—William K. Weimer

[57] ABSTRACT

An apparatus thermally laminates at least two materials together while minimizing wrinkles, ripples, curl, and color density loss in the laminate applying heat and pressure to the materials, by turning the laminate in a first direction away from a hotter laminating member causing a curvature of the laminate, and by turning the laminate in a second direction which reverses the curvature of the laminate.

23 Claims, 3 Drawing Sheets

APPARATUS AND METHOD FOR PREVENTING DEFECTS DURING THE LAMINATION OF MATERIALS

FIELD OF THE INVENTION

The present invention is directed generally to an apparatus and a method for preventing defects, such as wrinkles and ripples, in materials being laminating. In particular, the present invention can be directed to an apparatus and method for preventing or removing defects, such as wrinkles and tipples, in proofing materials when these materials are laminated together.

BACKGROUND OF THE INVENTION

Thermal lamination involves the application of heat and pressure to two or more materials being laminated. These materials can be in sheet or web form. One goal when laminating is to apply sufficient heat and pressure to complete the lamination. Ideally, this goal should be accomplished without causing excessive shrinkage or stretch, and wrinkles, ripples, or curl.

When materials, such as graphic arts proofing materials, are laminated, specific defects can occur. Examples of these additional defects include waves, waffle, color density loss, and microbubbles. Waves are a type of tipple which angle diagonally along the length of the materials and have consequently been referred to as "Christmas Tree" waves. Waffle is another defect made up of numerous criss-crossing tipples giving a quilted appearance to the affected area. Color density loss is the undesirable fading and/or inconsistency of colors within the laminate.

Several approaches have been taken to generally address wrinkling and the other defects caused by the thermal lamination process. U.S. Pat. No. 4,861,409 describes a thermal lamination process which automatically adjusts the distance of contact of two films with the heat roll. This allows for a constant amount of heat to be transferred to the films even when the lamination linespeed varies. The constant amount of heat is noted to provide sufficient bond strength without overheating which can cause creasing and clouding of the films. This invention is noted by the inventors to be particularly useful just after start-up of the laminating process or just before stopping the laminating process. But, this approach has not satisfactorily solved the wrinkling problem, nor any of the other previously mentioned problems.

U.S. Pat. No. 4,946,640 describes an apparatus having a guide member surface and the application of a vacuum to the laminate materials. The vacuum creates a generally uniform drag force across the width of the laminate materials. This drag force is noted by inventors to eliminate wrinkles which form naturally at the guide member surface. However, this approach is relatively complex and expensive with the additional cost of including and maintaining the vacuum-providing hardware.

Graphic arts materials can be especially vulnerable to wave, waffle, and color density loss. The lamination of certain graphic arts materials commonly involves transferring four colors from four film-based color sheets (cyan, magenta, yellow, and black) to a paper base sheet. The first color sheet is laminated to the base sheet to create a proof, which is then exposed to create a first color image. The color sheet backing is then stripped off leaving at least a portion of the colored material from the color sheet behind on the base sheet. The remaining three colors can be transferred to the base sheet and exposed in the same manner. The four-color image created on the base sheet can instead be made on a transfer sheet, and then, can be ultimately transferred from the transfer sheet to a base sheet. Color sheets and transfer sheets commonly include a polyester film backing, wherein base sheets commonly include a paper backing.

Known apparatus and methods for laminating these materials do not satisfactorily thermally laminate the materials while minimizing wrinkling, curl, wave, waffle, and color density loss.

SUMMARY OF THE INVENTION

The present invention overcomes these problems and provides an apparatus and method for minimizing the noted defects. One embodiment of the present invention includes an apparatus for thermally laminating materials to form a laminate and for guiding the laminate. This apparatus includes a first laminating member and a first heating means for heating the first laminating member to a first temperature. A second laminating member is positioned relative to the first laminating member to allow the materials to pass between the first and second laminating members such that the materials are heated to a laminating temperature and such that the first and second laminating members can apply pressure to the materials to form the laminate. A first guide is positioned relative to the first and second laminating members to enable the first guide to turn the laminate in a first direction away from the first laminating member. Turning the laminate in the first direction causes the laminate to have a curvature. A second guide is positioned relative to the first guide to enable the second guide to turn the laminate in a second direction. Turning the laminate from the first direction to the second direction reverses the curvature.

Another embodiment includes an apparatus for thermally laminating materials to form a laminate and for guiding the laminate. This apparatus includes means for heating the materials from a first material temperature to a second material temperature. Means are also included for applying pressure to the materials. The pressure-applying means is operatively coupled to the heating means such that pressure is applied to the materials when the heating means has heated the materials to above the first temperature to form the laminate. The pressure-applying means is positioned such that the laminate travels in an original direction when pressure is applied thereto. A first guide is positioned relative to the heating means and the pressure-applying means to enable the first guide to turn the laminate in a first direction which is different from the original direction. A second guide is positioned relative to the first guide to enable the second guide to turn the laminate in a second direction. The second direction is different from the first direction and is similar to the original direction.

Another embodiment includes an apparatus for thermally laminating materials to form a laminate and for guiding the laminate. This apparatus includes a heated upper roller and a heated lower roller positioned lower than the upper roller. The materials can travel between the heated upper and lower rollers in an original direction such that the heated upper and lower rollers can apply pressure and heat to the materials to form the laminate. The heated lower roller is heated to a lower temperature than is the heated upper roller. A first guide is positioned relative to the upper and lower rollers to enable the first guide to turn the laminate in a first direction downwardly away from the upper roller and toward the lower roller. A second guide is positioned relative to the first guide to enable the second guide to turn the laminate in a second direction away from the lower roller.

Another embodiment includes an apparatus for thermally laminating materials to form a laminate and for guiding the laminate. This apparatus includes a frame and a laminating assembly supported by the frame. The frame can include an assembly surface across which the materials can rest. A first laminating member is positioned adjacent to the assembly surface. Means are included for heating the first laminating member to a first temperature. A second laminating member is positioned relative to the assembly surface and the first laminating member such that the materials can be moved from the assembly surface and passed between the first and second laminating members and such that heat and pressure are applied to the materials when passing between the first and second laminating members to form the laminate. A guiding assembly is supported by the frame and positioned relative to the laminating assembly to receive and guide the laminate from the laminating assembly. The guiding assembly includes a first guide positioned relative to the first and second laminating members to enable the first guide to turn the laminate in a first direction away from the first laminating member. Turning the laminate in the first direction causes the laminate to have a curvature. A second guide is positioned relative to the first guide to enable the second guide to turn the laminate in a second direction. Turning the laminate from the first direction to the second direction reverses the curvature.

Another embodiment includes a method for thermally laminating materials together to form a laminate and for guiding the laminate. This method includes heating a first laminating member to a first temperature. Another step is heating a second laminating member to a second temperature, the second temperature being lower than the first temperature. Another step includes passing the materials between the first and second laminating members. The second laminating member is positioned relative to the first laminating member such that the first and second laminating members can apply heat and pressure to the materials to form the laminate. Another step includes turning the laminate exiting from between the first and second laminating members in a first direction away from the first laminating member. Turning the laminate in the first direction causes the laminate to have a curvature. Another step includes turning the laminate in a second direction. Turning the laminate from the first direction to the second direction reverses the curvature.

Another embodiment includes a method for thermally laminating a first sheet of proofing material to a second sheet of proofing material to form a laminate and for turning the laminate. This method includes heating a first laminating member to a first temperature. Another step includes heating a second laminating member to a second temperature, the second temperature being lower than the first temperature. Another step includes passing the first and second sheets of proofing material between the first laminating member and the second laminating member. The second laminating member is positioned relative to the first laminating member such that heat and pressure are applied to the first and second sheets of proofing material to form the laminate when the materials are passed between the first and second laminating members. Another step includes turning the laminate exiting from between the first and second laminating members in a first direction away from the first laminating member causing the laminate to have a curvature. Another step includes turning the laminate in a second direction. Turning the laminate from the first direction to the second direction reverses the curvature.

BRIEF DESCRIPTION OF THE DRAWINGS

The foregoing advantages, construction, and operation of the present invention will become more readily apparent from the following description and accompanying drawing in which.

DETAILED DESCRIPTION OF PREFERRED EMBODIMENTS

Figure 1:
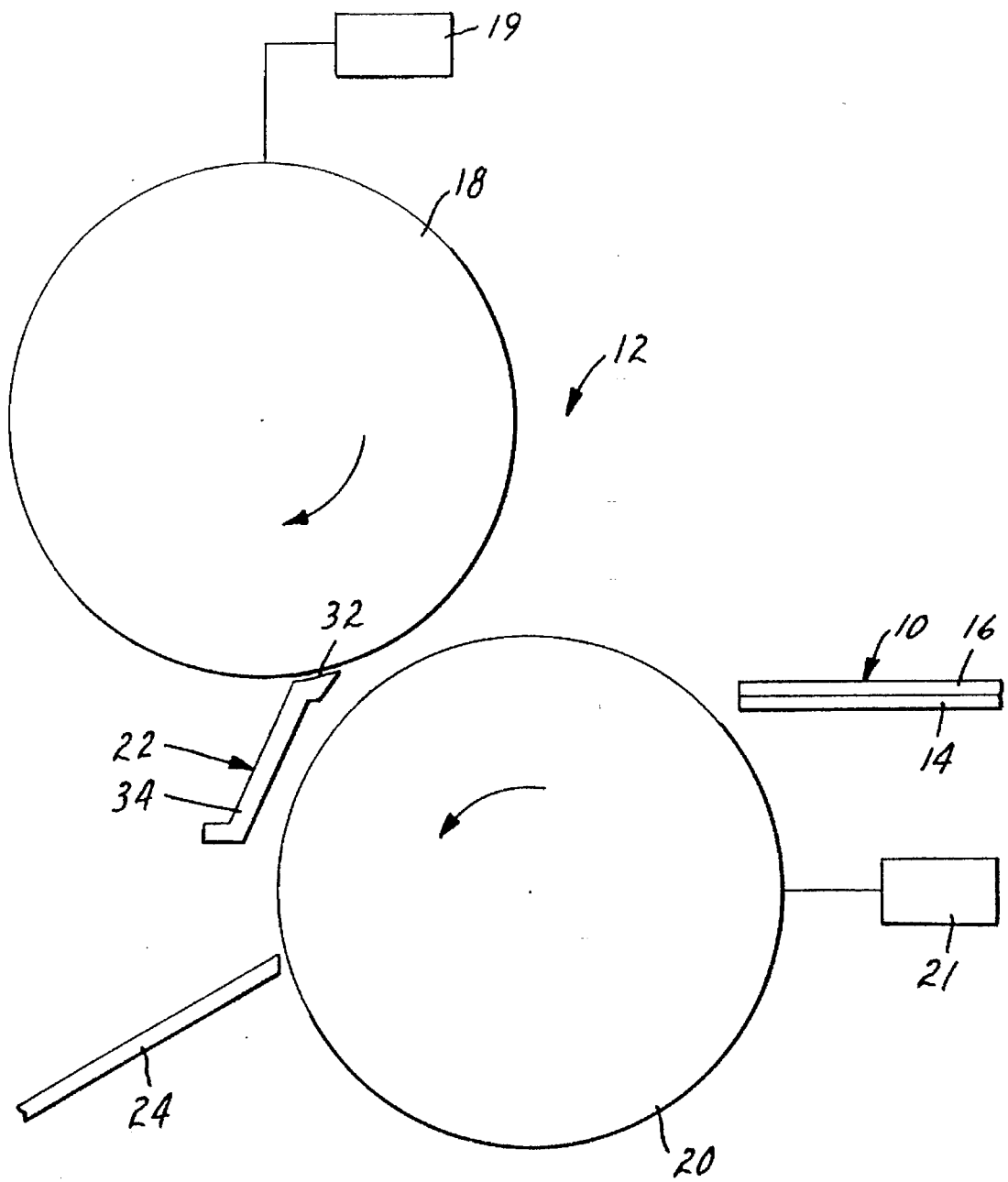
FIG. 1 is a side view of the one embodiment of the present invention, including two laminating rollers and two guides, wherein two sheets are shown before being inserted between the laminating rollers.

In FIG. 1, materials 10 are shown as being inserted in a thermal lamination apparatus 12. The materials 10 can be inserted into the thermal lamination apparatus 12 by hand or by drive rollers (not shown). The materials 10 are shown as including two sheets of proofing materials, a base sheet 14 and a color sheet 16. Other types of materials can be similarly laminated.

The thermal lamination apparatus 12 includes a first laminating member 18, a second laminating member 20, a first guide 22, and a second guide 24. The first laminating member 18 is shown as a first roller although other forms of laminating members could be used, for example, a series of smaller rollers, one or more belts, or the like. The second laminating member 20 is shown as a second roller, although similar alternative embodiments are possible.

The first and second laminating members 18, 20 can be heated to the same or different temperatures and can be driven to transport the materials 10. The first and second laminating members 18, 20 can each be made of a polymeric cylindrical core, a metallic cylindrical core covered with a polymeric coating, or a metallic cylinder, as is known in the art. For example, the first laminating member 18 can include an aluminum core covered with a 5-millimeter silicone coating, while the second laminating member 20 include an aluminum core covered with a low-adhesion surface, such as SilverStone™.

The relative position of the first and second laminating members 18, 20 can be such that the first and second laminating members 18, 20 apply heat and pressure to the materials 10 when the materials 10 are passed between the first and second laminating members 18, 20. When the materials 10 are not yet between the first and second laminating members 18, 20, the thermal lamination apparatus 12 can cause the first and second laminating members 18, 20 to be separated to allow for simple insertion of the materials 10. This also allows the leading portion of the materials to pass between the first and second laminating members 18, 20 without be heated or pressed. This can prevent the leading portion from sticking to and wrapping around one of the first and second laminating members 18, 20 and allow for simpler guiding of the leading portion away from the first laminating member 18.

The first laminating member 18 is shown as being an upper roller, and the second laminating member 20 is shown as being a lower roller. In addition, the alignment of the first laminating member 18 with respect to the second laminating member 20 is not necessarily vertical. The orientation shown includes a vertical offset of approximately 30 degrees. This offset takes advantage of gravity which contributes to a downward travel direction of the materials 10 as the materials 10 exit from between the first and the second laminating members 18, 20. However, different orientations are possible.

Figure 2:
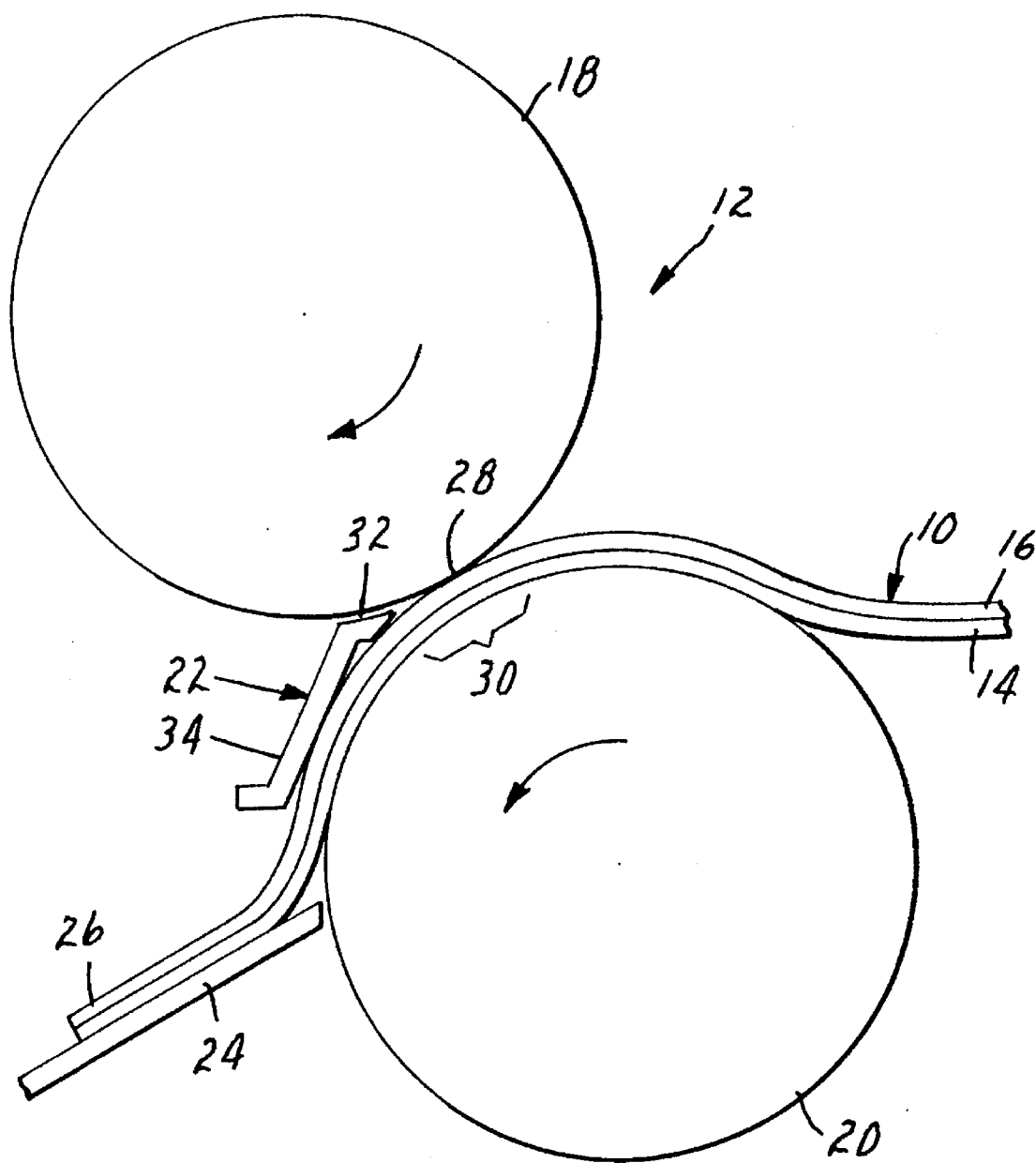
FIG. 2 is a side view of the embodiment shown in FIG. 1, wherein the two sheets are shown as being between the laminating rollers.

In FIG. 2, the materials 10 are shown as passing between the first and second laminating members 18, 20 as the first and second laminating members 18, 20 rotate. Heat and pressure are applied to the materials 10 by the first and second laminating members 18, 20 creating a laminate 26 which can exit from between the first and second laminating members 18, 20. When the materials 10 pass between the first and second laminating member 18, 20, the materials 10 can be said to travel in an original direction.

The heat and pressure are applied to the materials 10 at a contact nip location 28. The contact nip location 28 is a contact area defined by the width of the materials 10 and the flattened portion 30 of the first and second laminating members 18, 20 which contact the materials 10. For example, 30-inch wide materials (76.2 centimeters) and a flattened portion 30 of approximately 0.20 inch (0.5 centimeter) create contact nip location 28 of approximately 6.0 square inches (38.1 square centimeters) of contact area.

The embodiment shown in FIGS. 1 and 2 is able to thermally laminate several specific materials, including MatchPrint II™ and MatchPrint III™ materials (made by 3M Company, St. Paul, Minn.). To laminate MatchPrint III™ materials, for example, a temperature range for the first laminating member of approximately between 130 and 155 degrees Celsius (approximately 266 to 311 degrees Fahrenheit) and a temperature range for the second laminating member 20 of approximately 60 to 80 degrees Celsius (approximately 140 to 176 degrees Fahrenheit) has been shown to provide sufficient lamination (adequate adhesion of the color material within the color sheet 16 to the base sheet 14) and to minimize the previously noted defects.

The upper portion of the temperature range for the first laminating member 18 is preferred to minimize the air entrapment, while the lower portion of the temperature is preferred to maximize the life of the first laminating member 18 and maximize the dimensional stability of the laminate 26. Consequently, a tighter temperature range for the first laminating member of between 138 and 146 degrees Celsius (approximately 280 to 295) may be preferred.

The upper portion of the temperature range for the second laminating member 20 is preferred at least for the reason of ensuring sufficient lamination while the lower portion is preferred to reduce wave and waffle and to maximize dimensional stability. Consequently, a tighter temperature range of approximately 66 to 77 degrees Celsius (approximately 150 to 171 degrees Fahrenheit) is preferred. More specifically, consistent and acceptable results have occurred when the first laminating member 18 is held at 146 degrees Celsius (approximately 295 degrees Fahrenheit) and the second laminating member is held at a temperature of 68 degrees Celsius (approximately 155 degrees Fahrenheit).

In addition to the heat applied to the materials 10 due to the above described temperature ranges, pressure is applied to these materials 10 by the first and second laminating members 18, 20. A pressure range of between 2.1 and 2.52 kilograms per square centimeter (30 to 36 pounds per square inch) has been shown to be effective, although a wider range of approximately between 15 to 50 pounds per square inch is feasible. A tighter pressure range can be especially important for lamination of damp paper base sheets, for example, when paper base sheets have been subjected to a high humidity environment.

Figure 3:
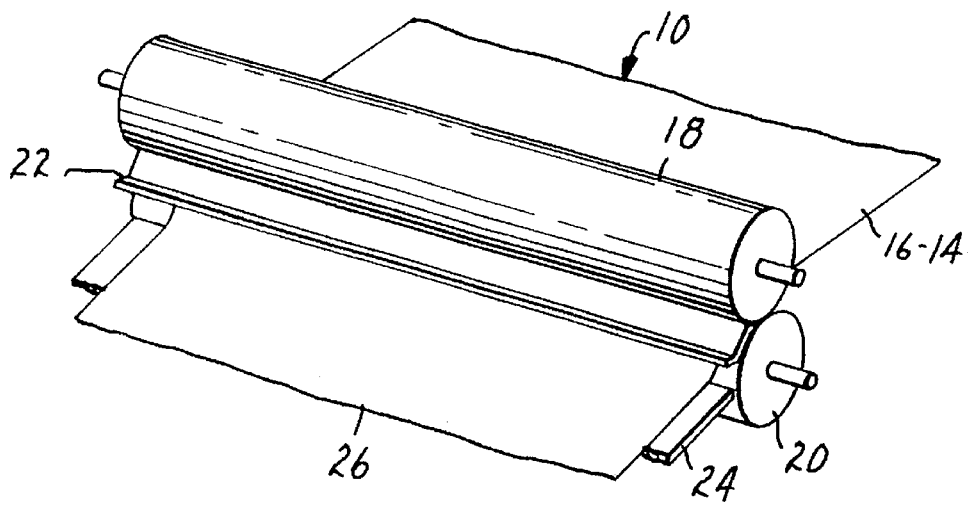
FIG. 3 is an isometric view of the embodiment shown in FIGS. 1 and 2.

One way of applying the previously-noted pressure to 76.2-centimeter wide (30-inch) materials 10 is by applying, for example, 100 pounds downwardly to each of the two bearings of the first laminating member 18 (as shown in FIG. 3). The force to the bearings can, of course, be applied upwardly to the bearings of the second laminating member 20.

The first and second laminating members 18, 20, when implemented as rollers, can be crowned to minimize defects. A preferred crown on the first laminating member 18 is approximately 0.005-inch (with respect to the diameter) when the first laminating member 18 is approximately 31.8 inches wide, 3.35 inches in diameter. A preferred crown on the second laminating member 18 is approximately 0.005-inch (with respect to the diameter) when the second laminating member 20 is approximately 31.8 inches wide, 3.35 inches in diameter.

The rate at which the above-described materials 10 can be transported between the first and second laminating members 18, 20 (within the above described temperature and pressure ranges) is approximately between 1.27 and 1.65 meters per minute (approximately 50 to 65 inches per minute). It is recognized that the combination of the temperatures, pressure, and transport rate may be different for different materials (for example, the adhesive chemistry in the materials or the thickness of the material backing).

The first guide 22 is shown as being positioned so that the first guide 22 can turn the laminate 26 away from the first laminating member 18 to prevent the first laminating member 18 from significantly heating the laminate 26 after the laminate 26 exits the contact nip location 28. In other words, the position of the first guide 22 can control the amount of heat applied to the laminate 26 by the first laminating member 18. This results in reduced and consistent dimensional changes (with corresponding color-to-color registration for multi-color proofing). This also results in minimized color density loss of the materials 10, which can be especially important for particular materials laminated in a high humidity environment.

Turning the laminate 26 away from the first laminating member 18 causes the laminate 26 to travel in a first direction and to have a curvature, preferably a simple curvature. In one embodiment, the first guide 22, by turning the laminate 26 to the first direction, can cause an approximately 30-degree direction change. The first direction can be toward the second laminating member 20 so that the laminate approaches or even contacts the second laminating member 20. Contact with a second laminating member 20 which is cooler than the first laminating member 18 can result in reduced dimensional defects.

The first guide can include a stripping portion 32 and a guiding portion 34. If the laminate 26 adheres to or follows closely with the first laminating member 18, the stripping portion 32 can then strip the laminate 26 away from the first laminating member 18 and the guiding portion 32 can turn the laminate 26 away from the first laminating member 18. If the laminate 26 does not adhere to the first laminating member 18, the guiding portion 34 can still turn the laminate 26 away from the first laminating member 18. Or, if the laminate 26 follows closely with the second laminating member 20 when exiting from between the first and second laminating members 18, 20, the laminate will still have a curvature.

The stripping portion 32 can be knifed-edged and held against or close to the first laminating member 18. The angle of the knife-edge of the stripping portion 32 can be chosen to assist in achieving the desired first direction. The stripping portion 32 can, for example, be made of or covered with a low-friction material, such as Teflon™, to prevent scratching to or adhering of the laminate 26. Similarly, the guiding portion 34 can be made of or covered with low-friction materials, such as Teflon™, or be made of a sheet metal or a plastic and covered with a low-friction material.

The second guide 24 is shown as being flat and positioned relative to the first guide 22 and to the second laminating members 18, 20 to turn the laminate 26 in a second direction, away from the second laminating member 20. If the laminate 26 exits from between the first and second laminating members 18, 20 and is turned, or curved, by other than the first guide 22 (e.g., by a tendency of the laminate 26 to follow near the second laminating member 20), the second guide 24 will still turn the laminate 26 in the second direction. By turning the laminate 26 from the first direction to the second direction, in one embodiment, the second guide 24 can cause an approximately 30-degree direction change, or approximately back to the original direction of the laminate 26 before being turned to the first direction.

As shown, the second guide 24 reverses the curvature of the laminate 26, and can do so while the laminate 26 is still at an elevated temperature due to the heat applied by the first and second laminating members 18, 20. The curvature and the reversed curvature causes the laminate 26 to travel in a generally S-shaped path after passing between the first and second laminating members 18, 20. The radius of the reversed curvature is sufficiently small to reduce distortion of the laminate 26, but is sufficiently large to not excessively stretch the laminate 26 in the axis which parallels the travel direction of the laminate through the thermal lamination apparatus 12. The radius of the reversed curvature shown to function for the above-specified materials is approximately between 0.050 and 0.102 meters (approximately 2 to 4 inches). A more preferred radius is between 0.064 and 0.089 meters (between 2.5 and 3.5 inches).

Like the first guide 22, the second guide 24 can be made of a low-friction material, or of a sheet metal or plastic and covered with a low-friction material (e.g., Teflon™). While both the first and second guides 22, 24 are shown as being stationary, it is recognized that the guides 22, 24 can be moveable. In addition, it is recognized that differently-shaped guides or different guiding means which can cause similar curvature and reversed curvature of the laminate 26 could be used.

By curving the laminate 26 in the transport direction (as shown) just after lamination, the laminate 26 is not allowed to deform from the simply curved surface defined by the simply curved laminate. By curving the laminate 26 in the transport direction (as shown) and then reversing the curvature just after lamination, defects are prevented from forming, or protruding or indented portion of the surface of the laminate 26 are forced back to a simply curved surface.

While the laminate 26 is shown as being first curved downwardly and away from the hotter first laminating member 20, then being curved to create a reversed curvature, just the opposite can be caused (first curved upwardly). For this opposite approach, it may be preferred to prevent the laminate 26 from contacting the hotter laminating member by insulating the hotter laminating member or by making the lower laminating member the hotter laminating member.

Figure 4:
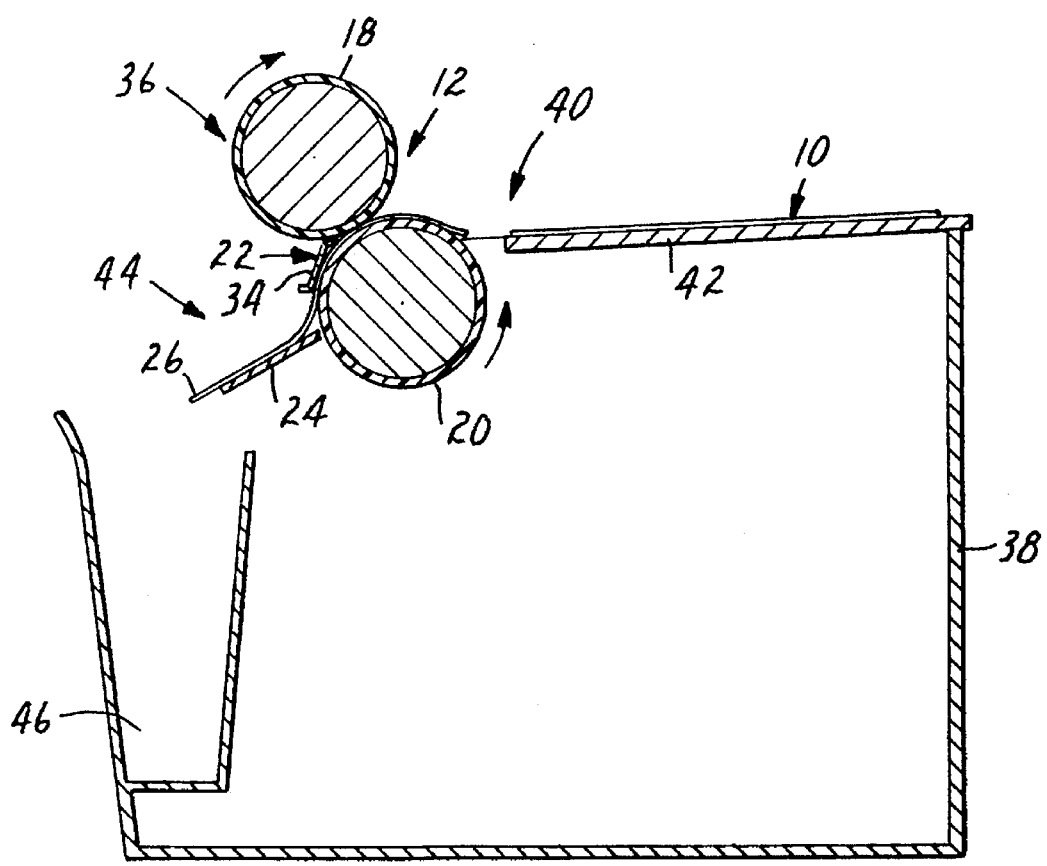
FIG. 4 is a perspective view of one embodiment of the present invention shown in FIGS. 1, 2, and 3 and further including a frame.

In FIG. 4, the thermal lamination apparatus 12 shown in FIGS. 1 and 2 is shown as part of a larger apparatus 36. The larger apparatus 36 includes a a frame 38 and a laminating assembly 40 supported by the frame 38. The laminating assembly 40 includes an assembly surface 42 across which the materials 10 can rest. The first laminating member 18 is positioned adjacent to the assembly surface 42. A first heating means (not shown) heats the first laminating member to a first temperature. A second laminating member 20 is positioned relative to the assembly surface 42 and the first laminating member 18 such that the materials 10 can be moved from the assembly surface 42 and passed between the first and second laminating members 18, 20 and such that heat and pressure are applied to the materials 10 when passing between the first and second laminating members 18, 20. A second heating means (not shown) can heat the second laminating member 20. As previously noted, the heat and pressure applied to the materials 10 form the laminate 26.

A guiding assembly 44 is supported by the frame 38 and positioned relative to the laminating assembly 40 to guide the laminate 26 from the laminating assembly 40. The guiding assembly includes
a first guide 22 positioned relative to the first and second laminating members 18, 20 to enable the first guide 22 to turn the laminate 26 exiting from between the first and second laminating members 18, 20 in a first direction away from the first laminating member 18 and cause the laminate 26 to have a curvature. A second guide 24 is positioned relative to the first guide 22 to turn the laminate 26 in a second direction. Turning the laminate from the first direction to the second direction causes the laminate 26 to have a reversed curvature.

A trough 46 is positioned relative to the second guide 24 for receiving and holding the laminate 26 after being turned by the second guide 24.

Other embodiments similar to those noted are contemplated and should be considered as part of the present invention. Still other embodiments particularly suited to thermally laminate materials other than the proofing sheets are contemplated an should be considered as part of the present invention.

We claim:

1. An apparatus for thermally laminating materials to form a laminate and for guiding the laminate, comprising:

a first laminating, member;

first heating means for heating the first laminating member to a first temperature;

a second laminating member positioned relative to the first laminating member to allow the materials to pass between the first and second laminating members such that the materials are heated to a laminating temperature and such that the first and second laminating members can apply pressure to the materials to form the laminate;

second heating means for heating the second laminating member to a second temperature which is lower than the first temperature;

a first guide positioned relative to the first and second laminating members to enable the first guide to turn the laminate in a first direction away from the first laminating member, wherein turning the laminate in the first direction causes the laminate to have a curvature; and a second guide positioned relative to the first guide to enable the second guide to turn the laminate in a second direction, wherein turning the laminate from the first direction to the second direction reverses the curvature.

2. The apparatus of claim 1, wherein the first laminating member is a first roller, wherein the second laminating member is a second roller.

3. The apparatus of claim 2, wherein at least one of the first and second rollers is a driven roller.

4. The apparatus of claim 1, wherein the first and second laminating members can apply pressure to the materials at a contact nip location, and wherein the first guide is positioned to guide the laminate away from the first laminating member after the laminate passes beyond the contact nip location.

5. The apparatus of claim 1, wherein the pressure applied to the materials is between 2.10 and 2.52 kilograms per square centimeter.

6. The apparatus of claim 1, wherein the first temperature is between 130 and 155 degrees Celsius and the second temperature is between 60 and 80 degrees Celsius.

7. The apparatus of claim 1, wherein the first temperature is between 138 and 146 degrees Celsius and the second temperature is between 68 and 77 degrees Celsius.

8. The apparatus of claim 1, wherein the first and second guides are positioned to cause the laminate to follow a generally S-shaped path when the laminate exits from between the first and second laminating members.

9. The apparatus of claim 1, wherein the second guide is positioned such that the reversed curvature has a radius which is sufficiently small to minimize distortion but which is sufficiently large to minimize stretching of the laminate.

10. The apparatus of claim 1, wherein the reversed curvature has a radius of between 5.0 and 10.2 centimeters.

11. The apparatus of claim 1, wherein the first guide is positioned to guide the laminate against the second laminating member causing the second laminating member to contact the laminate for a greater distance than does the first laminating member.

12. The apparatus of claim 1, wherein the first guide comprises a first stationary surface, and wherein the second guide comprises a second stationary surface.

13. The apparatus of claim 1, wherein the first and second guides contact the laminate before the laminate cools significantly below the laminating temperature.

14. An apparatus for thermally laminating materials to form a laminate and for guiding the laminate, comprising:
   means for heating the materials from a first material temperature to a second material temperature;
   means for applying pressure to the materials, wherein the pressure-applying means is operatively coupled to the heating means such that pressure is applied to the materials when the heating means has heated the materials to above the first temperature to form the laminate, and wherein the pressure-applying means is positioned such that the laminate travels in an original direction when pressure is applied thereto;
   a first guide positioned relative to the heating means and the pressure-applying means to enable the first guide to turn the laminate in a first direction which is different from the original direction; and
   a second guide positioned relative to the first guide to enable the second guide to turn the laminate in a second direction, wherein the second direction is different from the first direction and is similar to the original direction;
   wherein the pressure-applying means drives the laminate against and beyond the first and second guides.

15. An apparatus for thermally laminating materials to form a laminate and for guiding the laminate, comprising:
   a heated upper roller;
   a heated lower roller positioned lower than the upper roller, wherein the materials can travel between the heated upper and lower rollers in an original direction such that the heated upper and lower rollers can apply pressure and heat to the materials to form the laminate, and wherein the heated lower roller is heated to a lower temperature than is the heated upper roller;
   a first guide positioned relative to the upper and lower rollers to enable the first guide to turn the laminate in a first direction downwardly away from the upper roller and toward the lower roller; and
   a second guide positioned relative to the first guide to enable the second guide to turn the laminate in a second direction away from the lower roller.

16. An apparatus for thermally laminating materials to form a laminate and for guiding the laminate, comprising:
   a frame;
   a laminating assembly supported by the frame, comprising:
   assembly surface across which the materials can rest;
   a first laminating member positioned adjacent to the assembly surface;
   means for heating the first laminating member to a first temperature;
   a second laminating member positioned relative to the assembly surface and the first laminating member such that the materials can be moved from the assembly surface and passed between the first and second laminating members and such that heat and pressure are applied to the materials when passing between the first and second laminating members to form the laminate;
   means for heating the second laminating member to a second temperature, the second temperature being lower than the first temperature; and
   a guiding assembly supported by the frame and positioned relative to the laminating assembly to receive and guide the laminate from the laminating assembly, comprising:
   a first guide positioned relative to the first and second laminating members to enable the first guide to turn the laminate in a first direction away from the first laminating member and to cause the laminate to contact the second laminating member for a longer period of time than the first laminating member; and
   a second guide positioned relative to the first guide to enable the second guide to turn the laminate in a second direction away from the second laminating member.

17. The apparatus of claim 16, further comprising a trough positioned relative to the second guide for receiving and holding the laminate after being guided by the second guide.

18. An apparatus for thermally laminating materials to form a laminate and for guiding the laminate, comprising:
   a first laminating member;
   first heating means for heating the first laminating member to a first temperature;
   a second laminating member positioned relative to the first laminating member to allow the materials to pass between the first and second laminating members such that the materials are heated to a laminating temperature and such that the first and second laminating members can apply pressure to the materials to form the laminate;
   a first guide having a first stationary surface positioned relative to the first and second laminating members to enable the first stationary surface to turn the laminate in a first direction away from the first laminating member, wherein turning the laminate in the first direction causes the laminate to have a curvature; and
   a second guide having a second stationary surface positioned relative to the first guide to enable the second stationary surface to turn the laminate in a second direction, wherein turning the laminate from the first direction to the second direction reverses the curvature.

19. The apparatus of claim 18, the first guide causing the laminate to contact the second laminating member for a longer period of time than does the first laminating member.

20. The apparatus of claim 18, the first and second laminating member positioned to drive the laminate against the first and second guides and beyond the first and second guides.

21. A method for thermally laminating materials to form a laminate and for guiding the laminate, comprising the steps of:

providing a first laminating member;

heating the first laminating member to a first temperature;

providing a second laminating member positioned relative to the first laminating member to allow the materials to pass between the first and second laminating members such that the materials are heated to a laminating temperature and such that the first and second laminating members can apply pressure to the materials to form the laminate;

heating the second laminating member to a second temperature which is lower than the first temperature;

providing a first guide which turns the laminate in a first direction away from the first laminating member when the laminate is transported from the first and second laminating members, wherein turning the laminate in the first direction causes the laminate to have a curvature; and providing a second guide which turns the laminate in a second direction, wherein turning the laminate from the first direction to the second direction reverses the curvature.

22. The method of claim 21, the step of providing the first guide causing the laminate to contact the second laminating member for a longer period of time than does the first laminating member.

23. The method of claim 21, the steps of providing the first and second laminating members causing the laminate to be driven against the first and second guides and beyond the first and second guides.

\* \* \* \* \*

UNITED STATES PATENT AND TRADEMARK OFFICE
CERTIFICATE OF CORRECTION

PATENT NO.: 5,641,374
DATED: June 24, 1997
INVENTOR(S): Peterson et al.

It is certified that error appears in the above-identified patent and that said Letters Patent is hereby corrected as shown below:

Column 1, line 11, "tipples" should read --ripples--.

Column 1, line 26, "tipple" should read --ripple--.

Column 1, line 30, "tipples" should read --ripples--.

Signed and Sealed this

Tenth Day of February, 1998

Attest:

BRUCE LEHMAN

*Attesting Officer*          *Commissioner of Patents and Trademarks*